US008794863B2

(12) United States Patent
Hohmann et al.

(10) Patent No.: US 8,794,863 B2
(45) Date of Patent: Aug. 5, 2014

(54) CONNECTOR FOR JOINING AN ELONGATED COMPONENT TO A THREADED ROD

(75) Inventors: Gerd Hohmann, Sommerhausen (DE); Markus Ferdinand, Donsieders (DE); Albert Spongk, Niederstetten (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 1312 days.

(21) Appl. No.: 11/423,925

(22) Filed: Jun. 13, 2006

(65) Prior Publication Data
US 2006/0278032 A1 Dec. 14, 2006

(30) Foreign Application Priority Data
Jun. 14, 2005 (DE) .......................... 10 2005 027 281

(51) Int. Cl.
*F16B 21/00* (2006.01)
(52) U.S. Cl.
USPC .......................... 403/322.4; 403/325; 403/330
(58) Field of Classification Search
USPC .............. 403/321, 322.4, 325, 330, 373, 375, 403/320; 411/304, 433; 74/441, 535
See application file for complete search history.

(56) References Cited

U.S. PATENT DOCUMENTS

| 1,308,176 | A | * | 7/1919 | Field |
| 1,312,942 | A | * | 8/1919 | Anderson et al. .......... 74/424.78 |
| 1,634,422 | A | * | 7/1927 | Holmes .......................... 403/373 |
| 1,851,843 | A | * | 3/1932 | Inman ............................ 403/375 |
| 2,448,342 | A | * | 8/1948 | Zagar |
| 2,448,817 | A | * | 9/1948 | McArthur ...................... 403/321 |
| 2,965,382 | A | * | 12/1960 | Schlage |
| 3,179,738 | A | * | 4/1965 | De Lyon |
| 4,275,594 | A | * | 6/1981 | Varga et al. |
| 4,674,780 | A | * | 6/1987 | Weinerman et al. ............ 74/535 |
| 4,798,098 | A | * | 1/1989 | Keller et al. .................... 74/470 |
| 4,828,510 | A | * | 5/1989 | Muzslay |
| 4,844,463 | A | * | 7/1989 | Zembrod ....................... 403/290 |
| 4,976,174 | A | * | 12/1990 | Walsh ........................... 403/325 |
| 5,230,596 | A | * | 7/1993 | Morad |

(Continued)

FOREIGN PATENT DOCUMENTS

DE 7417689 2/1975
DE 3145421 A1 6/1982
(Continued)

*Primary Examiner* — Victor MacArthur
(74) *Attorney, Agent, or Firm* — Lowe Hauptman & Ham LLP

(57) ABSTRACT

A connector for joining a plastic, elongated component and a threaded rod insertable into a borehole of the elongated component, which in turn is guided within a stationary bush, includes a locking element for locking the threaded rod in the borehole. The elongated component has a slot between the borehole and its outer surface. The locking element includes a two-arm lever configured within the slot and has a first end which has an engagement portion that can engage in locking manner the thread of the threaded rod, and a second end projecting outward beyond the slot when the engagement portion engages the thread. The lever's first end is prestressed toward the borehole and the lever is dimensioned in a manner that the second end pivots into the slot as the component is being pushed into the bush, as a result of which the engagement portion leaves the borehole, whereas the lever pivots back when the component has been slipped so far into the bush that the second lever end is released from the bush.

13 Claims, 1 Drawing Sheet

(56) References Cited

U.S. PATENT DOCUMENTS

| | | |
|---|---|---|
| 5,794,995 A | 8/1998 | Creesy et al. |
| 5,842,810 A * | 12/1998 | Morad ............... 403/320 |
| 6,543,317 B1 * | 4/2003 | Rinner et al. |
| 7,114,982 B2 * | 10/2006 | Shimizu et al. |
| 7,198,238 B2 * | 4/2007 | Inoue |
| 7,506,562 B2 * | 3/2009 | Franze et al. ............... 74/575 |

FOREIGN PATENT DOCUMENTS

| | | |
|---|---|---|
| DE | 8323284 U1 | 1/1984 |
| DE | 8912612 U1 * | 1/1990 |
| DE | 19949695 A1 | 4/2001 |
| WO | 9929988 A1 | 6/1999 |

\* cited by examiner

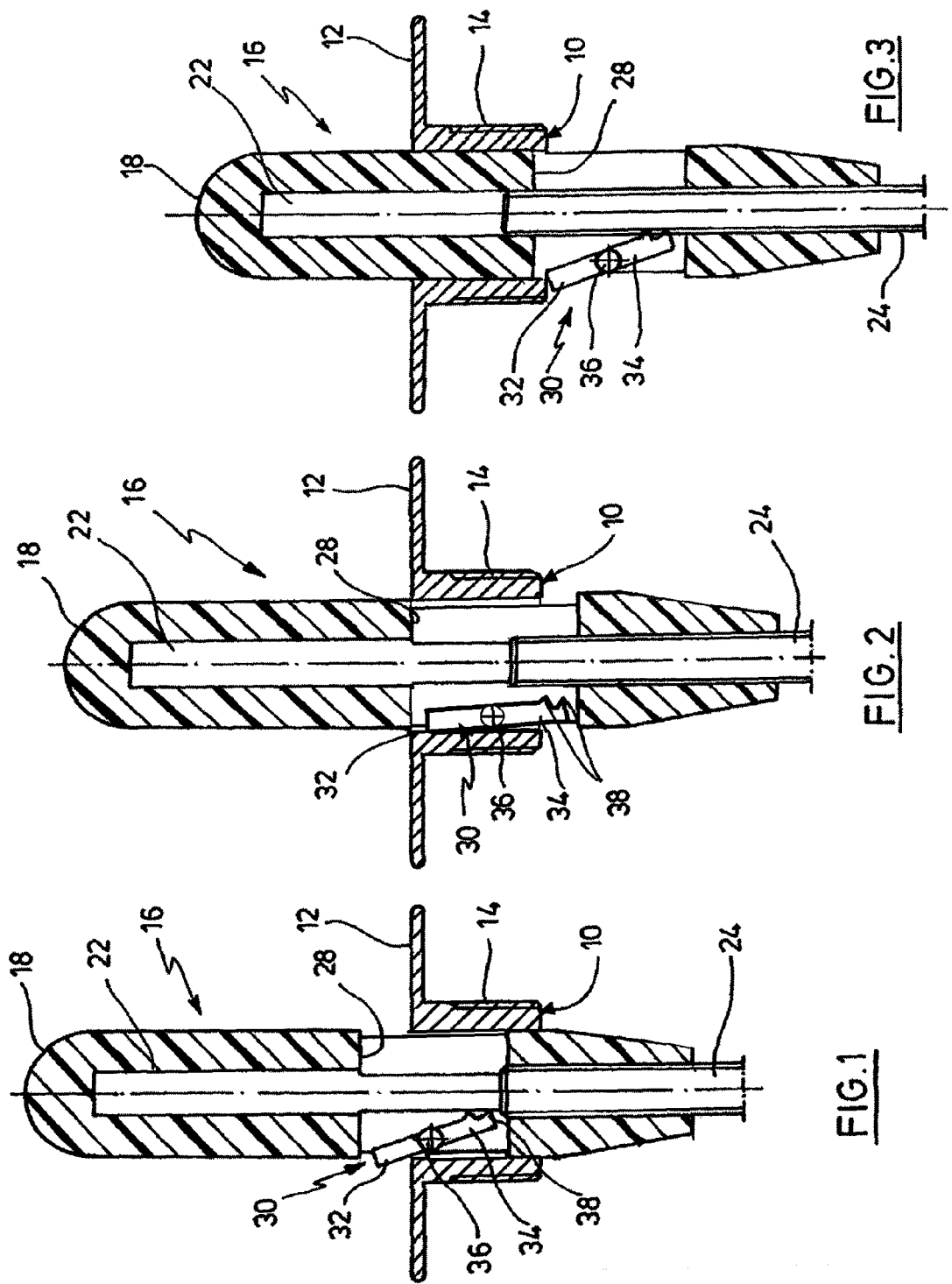

CONNECTOR FOR JOINING AN ELONGATED COMPONENT TO A THREADED ROD

RELATED APPLICATIONS

The present application is based on, and claims priority from, German Application Number 10 2005 027 281.9, filed Jun. 14, 2005, the disclosure of which is hereby incorporated by reference herein in its entirety.

TECHNICAL FIELD

The present invention relates to a connector for joining an elongated component to a threaded rod.

BACKGROUND

Many installations require in particular a plastic component to be connected to a threaded rod, where one or both these elements may have tolerances such that the associated ends of both elements differ in length. Illustratively a pin configured on the inside of a car door is coupled to a door locking linkage. When locking the door, the pin is inserted or forcefully depressed and thereby locks the door, sometimes all the car doors simultaneously (centralized locking). As a rule the pin is made of plastic and the linkage is threaded at its operative end that is received in a borehole of said pin. It is known to fit this borehole with a thread by means of which the pin is screwed onto the rod. Preferably however the said pin assumes a predetermined position relative to the seat receiving it in the door. This preference derives from the circumstance that during the door locking procedure, the pin should be lowered within the said seat to prevent it from being manually pulled out. Otherwise, such locking may be disengaged by opening or breaking the window of an automobile. When the pin is wholly received in the said seat, it cannot be pulled out manually.

SUMMARY

The objective of the present invention is to create a connector joining an elongated plastic component and a threaded rod and particularly applicable to car doors, where said connector allows very easily compensating component tolerances, in particular regarding the threaded rod, and especially the present invention is meant to allow simple installation.

As regards the connector of the present invention, the elongated component is fitted with a simple, deep borehole receiving the threaded rod in displaceable manner. Furthermore said elongated component is fitted with a slot configured between the borehole and the component's external surface. A two-arm lever or a rocker is mounted inside said slot, said lever/rocker comprising an inner end situated farther inward and fitted with an engagement portion. The other end is situated radially farther outside. The engagement portion is appropriately designed to grip the rod's thread in locking manner. The two-arm lever is prestressed and sized in such manner that the second end shall be pivoted into the slot when the component is inserted into a bush which is mounted in fixed manner for instance to the car door. In this manner the engagement portion disengages from the borehole and the threaded rod can be advanced into said borehole until the slot together with the two-arm lever has moved past the bush. Once this is the case, the two-arm lever pivots back and the engagement portion engages the threaded rod. In this manner locking has been established between the component and the threaded rod, as a result of which there shall be transmission of motion of the threaded rod or of the elongated component and vice-versa.

The above described connection is independent of the threaded rod's position and therefore allows compensating tolerances. Installation is unusually simple because requiring only advancing the elongated component through the bush and allowing the threaded rod to enter the borehole. Continued advance along the threaded rod automatically entails the locking of the two components to each other. Operational space required for this purpose is minimal in the extreme. Also rotational alignment of the parts to one another is not required. Because of the simple design, the manufacturing cost of the connector of the present invention also is very low,

BRIEF DESCRIPTION OF THE DRAWINGS

One illustrative embodiment mode of the present invention is elucidated below in relation to the appended drawings.

FIG. 1 shows the connector of the invention during one assembly stage,

FIG. 2 shows the connector of FIG. 1 in a further assembly stage,

FIG. 3 shows the connector of FIGS. 1 and 2 after the final assembly.

DETAILED DESCRIPTION OF EMBODIMENTS

The connector being a lever 30 of the invention is shown in section in FIGS. 1 through 3. A (n anchoring) bush 10 fitted with a flange 12 is inserted illustratively at the top side of the inner lining of a car door. The door or the inside lining is omitted from the drawing. The bush 10 is fitted with an external toothing 14 by which it can be locked into a recess of the door lining. The bush comprises a cylindrical passage and receives a cross-sectionally circular pin 16 which is rounded spherically at its upper end 18. An axial borehole 22 is present in the pin 16. Whereas being open downward, this borehole 22 is closed at the upper end of the pin 16 and it receives a threaded rod 24. The dimensions of the borehole 22 and of the thread of the threaded rod 24 are such that these parts may be simply slipped one over the other without significant radial play. The threaded rod 24 is part of a car door locking linkage, which is omitted.

The pin comprises a radially continuous slot 28 within which a two-arm lever 30 having an upper arm 32 and a lower arm 34 is configured. The lever 30 also is made of plastic, for instance being injection molded to an inside of the slot 28, but only between its ends at 36. FIGS. 1 and 3 show the unstressed position of the lever 30. If the lever 30 is pivoted clockwise (FIG. 2), torsion will be generated thereby by means of which the lever is prestressed toward the initial position. Accordingly the injection-molded connection in the slot 24 acts like a torsion spring. It is understood that a separate element also may be used that would be spring-loaded in the manner discussed above.

In its engagement portion, the lower lever arm 34 comprises two tips 38 spaced apart by a multiple of the thread pitch of the threaded rod 24. By means of these tips 38, the lever is able to engage the thread of the threaded rod 24 in the manner shown in FIG. 3. Obviously more than two tips may also be used.

The car door already was prefinished when the pin 16 is being installed and also already contains the locking linkage together with the threaded rod 24. The pin 16 is inserted into the bush 10, which also is already in place. In the process the threaded rod 24 slips into the borehole 27. As the lever 30 nears the bush 10, the upper arm 32 pivots clockwise as indicated by comparing FIG. 1. with FIG. 2. In this manner the pin 16 can be pushed farther down without opposition by the tips 38. The tips 38 are outside the borehole 22. Only after the lever 30, in the form of the upper end of its arm 32, has left the bush 10, shall it be able to pivot back into the opposite, i.e. counter-clockwise direction, whereby the tips 38 shall engage the thread of the threaded rod 24. In this manner a geometrically (positively) locking connection has been set up between the pin 16 and the threaded rod 24. The upward motion of the pin 16 is limited by the lever 30 because the upper arm's upper end comes to rest against the underside of the bush 10.

The invention claimed is:

1. A connector, comprising:
    an elongated component including a borehole into which a threaded rod is insertable, and a radial slot; and
    a locking element for locking the threaded rod inside the borehole, said locking element comprising a two-arm lever having a section where the two-arm lever is pivotally supported inside the slot and where the two-arm lever is integrally connected with the elongated component, wherein the two-arm lever is configured to pivot back, due to the integral connection with the elongated component, toward an initial position with respect to the elongated component after being temporarily rotated away from said initial position,
    wherein the two-arm lever further has:
        a first end biased radially inward with respect to the elongated component and having an engagement portion for lockingly engaging a thread of the threaded rod, and
        a second end biased radially outward with respect to the elongated component,
    wherein the elongated component has an open end from which the threaded rod is insertable and a closed end opposite to the open end,
    wherein the first end of the two-arm lever is arranged closer to the open end of the elongated component than the closed end, and the second end of the two-arm lever is arranged closer to the closed end of the elongated component than the open end,
    wherein the first and second ends are free of direct attachment to the elongated component, and
    wherein the section is between the first end and the second end.

2. The connector as claimed in claim 1, wherein the elongated component is a cross-sectionally circular pin.

3. The connector as claimed in claim 1, wherein the slot runs transversely through the elongated component.

4. The connector as claimed in claim 1, wherein the engagement portion comprises tips which are mutually spaced apart and configured to be engaged with the thread of the threaded rod.

5. The connector as claimed in claim 1, wherein the second end is configured to directly rest against a lower edge of a bush in which the elongated component is insertable when the engagement portion of the first end lockingly engages the thread of the threaded rod.

6. In combination, an elongated component, a threaded rod, a bush, and a connector for joining the elongated component with the threaded rod;
    the elongated component having a borehole and inserted into the bush;
    the threaded rod inserted into the borehole;
    said connector comprising a locking element for locking the threaded rod inside the borehole;
    wherein
    the elongated component has a radial slot within which said locking element is positioned,
    said locking element comprises a two-arm lever pivotally supported inside the slot and integrally connected with the elongated component, wherein the two-arm lever is configured to pivot back, due to the integral connection with the elongated component, toward an initial position with respect to the elongated component, after being temporarily rotated away from said initial position, and
    said two-arm lever has
        a first end biased radially inward with respect to the elongated component, said first end having an engagement portion for lockingly engaging a thread of the threaded rod, and
        a second end biased radially outward with respect to the elongated component, and
    the bush has
        an upper edge on which the second end directly rests when the threaded rod is not locked inside the borehole, and
        a lower edge against which the second end directly rests when the engagement portion of the first end lockingly engages the thread of the threaded rod, wherein the lower edge of the bush, against which the second end directly rests, prevents withdrawal of the elongated component from the bush.

7. The combination as claimed in claim 6, wherein the elongated component is a cross-sectionally circular pin.

8. The combination as claimed in claim 6, wherein the slot runs transversely through the elongated component.

9. The combination as claimed in claim 6, wherein the lever is pivotally supported on a wall of the slot.

10. The combination as claimed in claim 6, wherein the engagement portion is fitted with tips which are mutually spaced apart and configured to be engaged with the thread of the threaded rod.

11. The combination as claimed in claim 6, wherein
    the two-arm lever further comprises a section where the two-arm lever is pivotally supported inside the slot and where the two-arm lever is integrally connected with the elongated component,
    the first and second ends are free of direct attachment to the elongated component, and
    said section is between the first end and the second end.

12. The combination as claimed in claim 6, wherein the elongated component has an open end from which the threaded rod is inserted and a closed end opposite to the open end, and
    wherein the first end of the two-arm lever is arranged closer to the open end of the elongated component than the closed end, and the second end of the two-arm lever is arranged closer to the closed end of the elongated component than the open end.

13. In combination, an elongated component, a threaded rod, a bush, and a connector for joining the elongated component with the threaded rod;
    the elongated component having a borehole and insertable into the bush;
    the threaded rod insertable into the borehole;
    said connector comprising a locking element for locking the threaded rod inside the borehole;
    wherein
    the elongated component has a radial slot within which said locking element is positioned,
    said locking element comprises a two-arm lever having a section where the two-arm lever is pivotally supported inside the slot and where the two-arm lever is integrally connected with the elongated component, wherein the two-arm lever is configured to pivot back, due to the integral connection with the elongated component, toward an initial position with respect to the elongated component after being temporarily rotated away from said initial position, the two-arm lever further has:
- a first end biased radially inward with respect to the elongated component and having an engagement portion for lockingly engaging a thread of the threaded rod, and
- a second end biased radially outward with respect to the elongated component,
- wherein the first and second ends are free of direct attachment to the elongated component, and the section is between the first end and the second end, and the bush has
- an upper edge on which the second end directly rests when the threaded rod is not locked inside the borehole, and
- a lower edge against which the second end directly rests when the engagement portion of the first end lockingly engages the thread of the threaded rod, wherein the lower edge of the bush, against which the second end directly rests, prevents withdrawal of the elongated component from the bush.

\* \* \* \* \*